(12) United States Patent
Hommeltoft

(10) Patent No.: US 6,340,414 B1
(45) Date of Patent: Jan. 22, 2002

(54) PROCESS FOR THE RECOVERY OF PERFLUORINATED SULPHONIC ACIDS FROM SPENT ACID

(75) Inventor: Sven Ivar Hommeltoft, Hillerød (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 09/348,917

(22) Filed: Jul. 7, 1999

(30) Foreign Application Priority Data

Jul. 31, 1998 (DK) ........................................ 1998 00995

(51) Int. Cl.[7] ...................... B01D 3/34; C07C 303/44; C07C 309/06
(52) U.S. Cl. .................. 203/49; 159/49; 159/DIG. 16; 159/DIG. 19; 203/89; 203/94; 203/70; 203/98; 585/458; 585/867
(58) Field of Search ................................ 203/49, 68, 9, 203/70, 100, 88, 94, 89, 98; 159/49, DIG. 16, DIG. 19; 502/3 D, 33, 216, 224; 585/816, 458, 833, 867, 902

(56) References Cited

U.S. PATENT DOCUMENTS

| | | | |
|---|---|---|---|
| 4,246,199 A * | 1/1981 | Arlt et al. ..................... | 203/89 |
| 5,220,095 A | 6/1993 | Hommeltoft et al. ........ | 585/720 |
| 5,245,100 A | 9/1993 | Hommeltoft et al. ........ | 585/720 |
| 5,472,921 A | 12/1995 | Hommeltoft .................. | 502/31 |
| 5,498,820 A | 3/1996 | Hommeltoft .................. | 585/730 |
| 5,603,812 A * | 2/1997 | Hommeltoft .................. | 203/49 |
| 5,603,817 A | 2/1997 | Settler et al. ................ | 204/433 |
| 5,618,769 A | 4/1997 | Hommeltoft .................. | 502/26 |
| 5,759,357 A | 6/1998 | Hommeltoft .................. | 203/29 |

FOREIGN PATENT DOCUMENTS

| | | |
|---|---|---|
| DK | 170396 | 7/1993 |
| EP | 614699 * | 9/1994 |

* cited by examiner

*Primary Examiner*—Virginia Manoharan
(74) *Attorney, Agent, or Firm*—Ostrolenk, Faber, Gerb & Soffen, LLP

(57) ABSTRACT

Process for the recovery of fluorinated sulphonic acid including the step of subjecting the spent acid to heat treatment with stepwise or continuously increasing temperature, withdrawing at least two fractions during the heat treatment; and recovering the fluorinated sulphonic acid from each fraction.

11 Claims, No Drawings

PROCESS FOR THE RECOVERY OF PERFLUORINATED SULPHONIC ACIDS FROM SPENT ACID

BACKGROUND

Fluorinated sulphonic acids are generally employed as acid catalyst for various reactions including alkylation of hydrocarbons such as isobutane with lower olefins such as propene and butenes as described in U.S. Pat. Nos. 5,220,095, 5,245,100 and 5,498,820. These processes produce typically various amounts of spent acid, in which the fluorinated sulphonic acid is passivated with respect to the desired reactions by by-products formed during the reaction. In order to ensure feasible economics the acid catalyst has to be recovered from the spent acid and recycled to the process.

The acid may be recovered from spent acid by treatment of the spent acid with sulphuric acid (U.S. Pat. No. 5,618,769) or esters of sulphuric acid. The acid may also be recovered by extraction from the spent acid with water, and, subsequently, isolation from the aqueous solution. Recovery of the acid from aqueous solution can either be achieved through distillation of a salt of the acid with sulphuric acid (DK 170,396) or by distillation after addition of a weak base in form of a salt of the acid to the aqueous solution of the acid in order to facilitate the separation of the acid and the water as described in U.S. Pat. Nos. 5,603,812 and 5,759,357. Furthermore, the acid can be recovered by hydrogenation of the spent acid over a hydrogenation catalyst (U.S. Pat. No. 5,472,921).

The Invention

It has now been found that thermal treatment results in release of the acid in its active form from spent acid, and the acid is then recovered from spent acid by direct distillation. Accordingly, this invention is a process for the recovery of fluorinated sulphonic acid including the step of subjecting the spent acid to heat treatment with stepwise or continuously increasing temperature, withdrawing at least two fractions during the heat treatment; and recovering the fluorinated sulphonic acid from each fraction.

It is desirable to keep the temperature as low as possible and to limit residence time in the distillation unit in order to avoid decomposition of the acid. In one embodiment of the invention distillation is, therefore, carried out under reduced pressure as illustrated in Example 1. In a further embodiment of the invention, distillation is performed by continuous flash distillation from a thin film in e.g. a falling film evaporator or forced film evaporator. This is illustrated in Examples 2–5 using a simplified laboratory unit of a falling film evaporator.

Vacuum distillation may be difficult to operate, in particular if volatile organic substances such as isobutane may be formed, since their condensation may require a refrigerated condenser.

In another embodiment of the invention, vacuum is replaced by a stripping agent, by which the acid is stripped off of spent acid using an inert hydrocarbon stream or other inert heated gas stream as stripping agent. Stripping is performed at atmospheric pressure or at elevated pressure to facilitate condensation of the stripping agent.

EXAMPLES

Example 1

Batch Distillation of Spent Acid

Spent acid withdrawn from isobutane alkylation using trifluoromethanesulphonic acid as catalyst was used for this experiment. Heating of the spent acid was performed in glassware at an absolute pressure of approximately 1 mmHg. 61.99 g of a spent acid containing 65.7 wt % (40.7 g) trifluoromethanesulphonic acid and 2,35 wt % (1,46 g) water were subjected to continuously increasing temperature between ambient and 200° C. and the following fractions were collected at different temperatures:

1. Fraction: up to 60° C. 1.45 g mostly organic (0.008 g TfOH).
2. Fraction: 60–120° C. 20.25 g are separated into two phases: 17.8 g of a heavy phase containing 15.45 g (86.2 wt %) trifluoromethanesulphonic acid and 1.26 g (7.08 wt %) water and a light phase containing an additional 0.4 g trifluoromethanesulphonic acid.
3. Fraction: 120–170° C. 31.43 g separating into two phases: 26 g of a heavy phase containing 22.0 g (83.8 wt %) trifluoromethanesulphonic acid and 0.06 g water and a light phase which proved to contain additionally 0.32 g trifluoromethanesulphonic acid.
4. Fraction: 170–200° C. 3.48 g containing 1.56 g trifluoromethanesulphonic acid (44.8 wt %).
5. Remanence: 4.20 g thick, slow flowing black tar containing 0.32 g (7.6 wt %) trifluoromethanesulphonic acid.

Example 2

Continuous Flash Distillation of Spent Acid

In the following Examples the spent acid was pumped to a flash distillation apparatus containing a hot surface, from which the distillate was evaporated. The heated surface was in form of a glass spiral heated on the outside by a condensing hydrocarbon. The inner surface of the glass spiral was the heated surface used for the flash distillation. The distillate referred to is the material that distilled overhead, while the residue is the material that flowed down through the heated glass spiral and was collected underneath. The spent acid used in this and the following Examples was withdrawn from an isobutane alkylation reaction and contained 65.1 wt % trifluoromethanesulphonic acid and 0.87 wt % water.

In this Example the glass spiral was heated with condensing dodecane corresponding to a temperature of 215° C. The flash distillation was performed at an absolute pressure of 100 mbar.

The experiment was performed in two steps: In a first step 385.25 g spent acid were processed to yield 326.8 g distillate and 51.13 g residue. In a second step 313.45 g acid were processed to yield 265.9 g distillate and 35.60 g residue. Both distillates consisting of two fractions were combined and 485.8 g of a heavy phase containing 85.5 wt % (415.4 g) trifluoromethanesulphonic acid and 0.90 wt % (4.37 g) water was isolated. An additional 1.1 g acid was found in the light phase from the distillate. The residue from the first part of the experiment contained 43 wt % (22.0 g) trifluoromethanesulphonic acid, whereas the residue from the second part contained only 29 wt % (10.5 g) trifluoromethanesulphonic acid.

The overall acid balance for the experiment shows that the 454.9 g trifluoromethanesulphonic acid contained in the combined 698.7 g spent acid processed in the experiment 416.5 g (91.6%) were found in the combined distillates, and 32.5 g (7.1%) were found in the residue. 5.9 g acid were not accounted for. This can be contributed partly to small amounts of material left in the equipment, partly to analysis inaccuracies. A small amount of the acid may also have decomposed during the processing even though the residence time was short.

Example 3
Fractionation of the heavy phase of the flash distillate from Example 2

Some of the acid phase of the distillate produced in Example 2 was redistilled to illustrate that high concentration acid can be achieved by simple distillation. This distillation was performed in batch distillation equipment consisting of a glass flask equipped with a short Vigreaux column, a glass condenser and a receiver for collection of the distillate fractions. The distillation equipment was connected to a vacuum line through a freezing trap kept at −196° C.

125.5 g of the acid phase from the flash distillation containing 85.5 wt % or 107.3 g trifluoromethanesulphonic acid and 0.9 wt % water was distilled at 50 mbar absolute pressure and following fractions collected:

1. Fraction: up to 75° C. 56.2 g of an acid phase containing 94.3 wt % (53.0 g) trifluoromethanesulphonic acid and 0.06 wt % water and about 0.4 g of a light organic phase.
2. Fraction: 75–95° C. 33.95 g of an acid phase containing 92.5 wt % (31.4 g) trifluoromethanesulphonic acid and 0.06% wt water.
3. Fraction: 95–118° C. 3.49 g containing 83.5 wt % (2.9 g) trifluoromethanesulphonic acid and 0.2% water.
4. Fraction: 118–122° C. 21.06 g of a heavy acid phase containing 85.9 wt % (18.1 g) trifluoromethanesulphonic acid and 6.0% (1.26 g) water and 1.2 g of a hydrocarbon phase.
5. Residue: 6.89 g containing 2.0 g trifluoromethanesulphonic acid.

The freezing trap contained 2.3 g light hydrocarbons.

Assuming that fraction 1–3 can be recycled to the alkylation process without further treatment, it can be concluded that 81% of the trifluoromethanesulphonic acid in the flash distillate is directly recyclable. Since the flash distillate from Example 2 contained 91.6% of the total acid in the feed to the flash distillation, the overall recovery is 75% leaving only 25% to be recovered by other means. (It is expected that optimisation will increase the efficiency of the recovery by flash distillation of the spent acid, even further).

Example 4
Flash Distillation of Spent acid at 100 mbar and 260° C.

In this Example the glass spiral was heated by condensing tetradecane corresponding to a temperature of 260° C. 275.1 g spent acid (179.1 g trifluoromethanesulphonic acid) were fed to the flash distillation and 206.4 g distillate were collected. The distillate separated into two phases. The heavy phase (180.9 g) contained of 146 g (80.6 wt %) trifluoromethanesulphonic acid and 1.66 g (0.92 wt %) water.

Example 5
Flash Distillation of Spent acid at 1020 mbar and 215° C.

395.7 g spent acid (257.6 g trifluoromethanesulphonic acid) were flash distilled at atmospheric pressure and 215° C. 123.33 g distillate were recovered. The distillate separated into two phases. The heavy phase (59.5 g) contained 91.0% trifluoromethanesulphonic acid (54.2 g). An additional 0.5 g trifluoromethanesulphonic acid was found in the light phase.

Example 6
Stripping of spent acid with n-pentane at 1020 mbar and 215° C.

This experiment was performed much like the experiment described in Example 5 with the exception that n-pentane vapour was fed to the bottom of the heated glass spiral and condensed with the distillate product. Thus, the n-pentane acted as a stripping agent for stripping trifluoromethanesulphonic acid out of the spent acid. The experiment was performed at atmospheric pressure with the glass spiral heated to 215° C. flash temperature.

A total amount of approximately 200–250 g n-pentane were passed through the glass spiral, while 170.4 g spent acid (110.9 g trifluoromethanesulphonic acid) was processed continuously. 91.67 g of a heavy phase separated from the distillate and proved to contain 89.9 wt % (82.4 g) trifluoromethanesulphonic acid. Additionally, 2.4 g were found in the hydrocarbon phase of the distillate, which consisted primarily of condensed pentane.

What is claimed is:

1. Process for the recovery of fluorinated sulphonic acid, the process comprising the steps of:

withdrawing spent fluorinated sulphonic acid from an acid catalyst process to obtain a withdrawn spent acid;

passing the withdrawn spent acid to thermal treatment in the presence of n-pentane as an inert stripping agent with stepwise or continuously increasing temperature;

obtaining at least two distillation fractions during the thermal treatment; and recovering the fluorinated sulphonic acid from each of the at least two fractions.

2. Process of claim 1, wherein the thermal treatment is performed in a thin film evaporator.

3. Process of claim 1, wherein the thermal treatment is performed under reduced pressure.

4. Process of claim 1, wherein the thermal treatment is performed in a counterflow column, wherein the spent acid is introduced at top of the column and the stripping agent in gaseous phase at bottom of the column.

5. Process of claim 4, comprising a subsequent step of condensing the n-pentane stripping agent.

6. Process of claim 4, wherein the n-pentane stripping agent is recycled to the thermal treatment.

7. Process of claim 4, comprising a subsequent step of condensing the n-pentane stripping agent.

8. Process of claim 1, wherein the fluorinated sulphonic acid comprises perfluoroalkane sulphonic acid.

9. Process of claim 1, wherein the step of distilling the spent acid is conducted under at least atmospheric pressure conditions.

10. Process of claim 1, wherein the inert stripping agent is provided as a gaseous stream.

11. Process of claim 1, wherein the thermal treatment of the spend acid is conducted under conditions of atmospheric pressure or elevated pressure.

* * * * *